US009463600B2

(12) United States Patent
Genda (10) Patent No.: US 9,463,600 B2
(45) Date of Patent: Oct. 11, 2016

(54) METHOD OF PRODUCING COMPOSITE OPTICAL ELEMENT (75) Inventor: Hideo Genda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 427 days.

(21) Appl. No.: 13/879,846

(22) PCT Filed: Oct. 25, 2011

(86) PCT No.: PCT/JP2011/075017
§ 371 (c)(1),
(2), (4) Date: Apr. 17, 2013

(87) PCT Pub. No.: WO2012/063665
PCT Pub. Date: May 18, 2012

(65) Prior Publication Data
US 2013/0221551 A1 Aug. 29, 2013

(30) Foreign Application Priority Data

Nov. 9, 2010 (JP) ................................. 2010-250905

(51) Int. Cl.
*B29D 11/00* (2006.01)
(52) U.S. Cl.
CPC .......... *B29D 11/00* (2013.01); *B29D 11/00403* (2013.01)
(58) Field of Classification Search
CPC ....... B29C 43/20; B29C 70/26; B29C 70/78; B29C 70/84; B29L 2011/00; B29K 2021/003; B29K 2101/12; B29K 2709/08; G02B 3/00; B29D 11/00; B29D 11/00403
USPC .................................. 264/1.36, 1.7, 2.6, 2.7
See application file for complete search history.

(56) References Cited

U.S. PATENT DOCUMENTS 2,727,843 A * 12/1955 Tillyer ............... B29D 11/0073
138/DIG. 1
4,227,950 A 10/1980 Spycher
(Continued)

FOREIGN PATENT DOCUMENTS

| CN | 1355094 A | 6/2002 |
|----|-----------|--------|
| EP | 552498 A1 | 7/1993 |
| JP | 3-133611 A | 6/1991 |
| JP | 3-286843 A | 12/1991 |
| JP | 5-254862 A | 10/1993 |

(Continued)

OTHER PUBLICATIONS

Rosato, Concise encyclopedia of plastics, 2000, p. 95-96.*

(Continued)

*Primary Examiner* — Alison L Hindenlang
*Assistant Examiner* — Jerzi H Moreno Hernandez
(74) *Attorney, Agent, or Firm* — Fitzpatrick, Cella, Harper & Scinto (57) ABSTRACT

Provided is a method of producing a composite optical element, including performing stress removal after molding a composite optical element by integrating a resin material with one surface of a glass material in a heated state, in which, after the composite optical element prepared in the molding is cooled to a first cooling temperature lower than a glass transition temperature of the resin material, an interface layer of the resin material, the interface layer contacting the glass material, is heated to a temperature equal to or higher than the glass transition temperature of the resin material, by causing infrared light having a wavelength region in which an infrared absorptivity of the resin material is higher than that of the glass material to enter from another surface of the glass material, and then the composite optical element is cooled to a second cooling temperature lower than the first cooling temperature.

11 Claims, 5 Drawing Sheets (56) References Cited

U.S. PATENT DOCUMENTS

| | | | | |
|---|---|---|---|---|
| 5,110,515 | A | * | 5/1992 | Nakamura ........ B29C 45/14655 |
| | | | | 257/E21.504 |
| 5,232,637 | A | * | 8/1993 | Dasher et al. ................ 264/1.32 |
| 5,259,999 | A | | 11/1993 | Iwakiri et al. |
| 5,372,755 | A | * | 12/1994 | Stoerr et al. .................. 264/1.27 |
| 7,070,862 | B1 | * | 7/2006 | Miyakawa et al. ........ 428/425.6 |
| 2002/0022219 | A1 | * | 2/2002 | Clements .............. B01L 3/5085 |
| | | | | 435/4 |
| 2002/0036747 | A1 | | 3/2002 | Yamanaka et al. |
| 2004/0174493 | A1 | * | 9/2004 | Chen ........................ G02C 7/02 |
| | | | | 351/159.62 |

FOREIGN PATENT DOCUMENTS

| | | | |
|---|---|---|---|
| JP | 05254862 | * | 10/1993 |
| JP | 6-230364 A | | 8/1994 |
| JP | 2005-305938 A | | 11/2005 |
| WO | 01/91994 A1 | | 12/2001 |

OTHER PUBLICATIONS

Office Action in Japanese Application No. 2010-250905 (issued Sep. 16, 2014).
Office Action in Chinese Application No. 201180053309.1 (dated Jul. 31, 2014).

* cited by examiner

RESIN MATERIAL (ZEONEX)
INFRARED ABSORPTION
WAVELENGTH 1650nm ~

FIG. 7B

GLASS MATERIAL (GENERAL OPTICAL GLASS)
INFRARED ABSORPTION WAVELENGTH 2700nm ~

1. thickness 0.70mm
2. thickness 1.00mm
3. thickness 2.00mm
4. thickness 3.00mm
5. thickness 5.00mm

METHOD OF PRODUCING COMPOSITE OPTICAL ELEMENT

TECHNICAL FIELD

The present invention relates to a method of producing a composite optical element in which a transparent thermoplastic resin material is integrated with one surface of a transparent glass material, and more specifically, to a method and an apparatus for producing a composite optical element while removing a cooling strain generated by a difference in shrinkage between a resin material and a glass material in a cooling process.

BACKGROUND ART

A composite optical element in which a transparent thermoplastic resin material is integrated with one surface of a transparent glass material has been produced practically. Examples of the composite optical element include an optical element produced by molding a resin material as a spacer between two glass lenses and an optical element produced by molding, on one surface of a glass plate, a resin material imparted with special optical properties into an optical waveguide or a prism.

PTL 1 discloses a technology for molding a composite optical element by performing injection molding of a thermoplastic resin material in a mold in which a glass substrate is placed. Moreover, PTL 2 discloses a technology for producing a composite optical element by forming a resin layer by performing injection molding of a resin material on a glass substrate and then cutting the contour of the resin layer so as for the contour to have a desired aspherical surface, followed by polishing.

PTL 3 discloses a technology for molding a composite optical element under compression by pressing a glass substrate supported by an upper mold onto a molten resin material placed in a lower mold from above, followed by heating under pressure.

CITATION LIST

Patent Literature

PTL 1: Japanese Patent Application Laid-Open No. H03-133611
PTL 2: Japanese Patent Application Laid-Open No. H05-254862
PTL 3: Japanese Patent Application Laid-Open No. 2005-305938

SUMMARY OF INVENTION

Technical Problem

However, when any of the above-mentioned methods of producing a composite optical element is adopted, a resin material and a glass material are integrated in a heated state, followed by cooling to room temperature, and hence residual stresses are generated in both the glass material and the resin material in the cooling process. In general, a resin material has a higher coefficient of thermal expansion than a glass material and shrinks at the time of its solidification, and hence a complicated cooling strain is generated in the resin material constrained by the glass material. When strain occurs in a thick resin layer, the refractive index of the resin material locally changes, resulting in a reduction in the performance of the resultant optical element.

Here, in order to reduce a residual stress (or cooling strain) after cooling, it may be an idea to select a resin material having a coefficient of thermal expansion close to that of a glass material. However, the kind of a resin material that can be used for a composite optical material is limited, and hence it is difficult to select such material. Further, it may also be an idea to blend an additive to reduce the degree of shrinkage of a resin material at the time of its solidification. However, such additive may impair the critical optical properties of the resin material.

Therefore, the composite optical element produced by integrating a resin material and a glass material in a heated state had low optical performance and had large variation in quality, and hence the composite optical element was unable to be used as a high-class optical element or a large-sized optical element.

Solution to Problem

The present invention has an object to provide a method of producing a composite optical element capable of providing an optical element having high quality and high functionality by reducing the residual strain of a composite optical element produced by integrating a resin material and a glass material in a heated state without impairing the optical properties of the resin material.

A method of producing a composite optical element of the present invention is a method of producing a so-called composite optical element in which a transparent thermoplastic resin material is integrated with one surface of a transparent glass material by heating. Further, the method includes: a molding step of molding a composite optical element by integrating the resin material with the one surface of the glass material in a heated state; a cooling step of cooling the composite optical element prepared in the molding to a first cooling temperature lower than a glass transition temperature of the resin material; a heating step of heating an interface layer of the resin material, the interface layer contacting the glass material, to a temperature equal to or higher than the glass transition temperature of the resin material, by causing infrared light having a wavelength region in which an infrared absorptivity of the resin material is higher than that of the glass material to enter from another surface of the glass material; and a stress removal step of cooling the composite optical element to a second cooling temperature lower than the first cooling temperature.

In the method of producing a composite optical element of the present invention, the interface layer of the resin material, the interface layer contacting the glass material, is heated intensively without heating the glass material too much by selecting the wavelength region of infrared light, thereby transferring the tissue of the interface layer according to its stress. While the temperature increase of the whole resultant composite optical element is being suppressed low, only the interface layer is softened, and the residual stresses of the glass material and resin material are released by causing the glass material and the resin material outside the interface layer as if to slip against each other at the interface layer. Then, the fact that the temperature increase of the glass material and the resin material outside the interface layer is suppressed low results in the generation of only a very small amount of cooling stress in a subsequent cooling process.

Thus, an optical element having high quality and high functionality can be provided by reducing the residual strain of a composite optical element produced by integrating a resin material and a glass material in a heated state without impairing the optical properties of the resin material. In addition, the production of a composite optical element for high-class use or a large-sized optical element is also enabled.

Further features of the present invention will become apparent from the following description of exemplary embodiments with reference to the attached drawings.

DESCRIPTION OF EMBODIMENTS

An embodiment of the present invention is hereinafter described in detail with reference to the drawings. The present invention can also be carried out in another embodiment performed by replacing part or the whole of the constitution of the embodiment with its alternative constitution as long as an interface layer of a resin material, the interface layer contacting a glass material, is heated intensively by infrared light.

Therefore, the present invention can be used for producing not only a composite optical element in which a glass material is placed on one surface of a resin material but also a composite optical element in which glass materials are placed on both surfaces of a resin material. Specific application examples of the composite optical elements include a lens or prism for a camera, a lens for a liquid crystal projector, an fθ lens for a laser beam printer, a pickup lens for a DVD or a CD, a diffractive optical element, and an optical waveguide.

<Composite Optical Element>

Figure 1A:
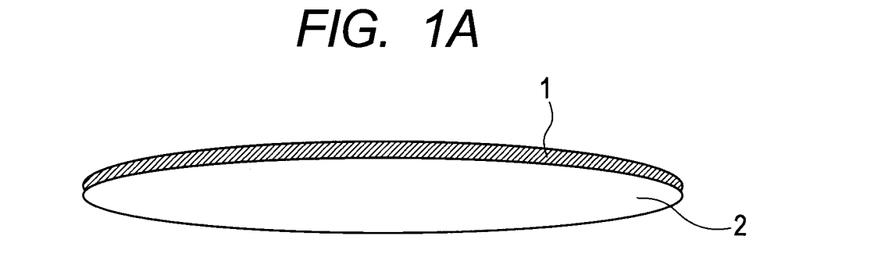
FIGS. 1A and 1B are explanatory diagrams of composite optical elements.
Figure 1B:
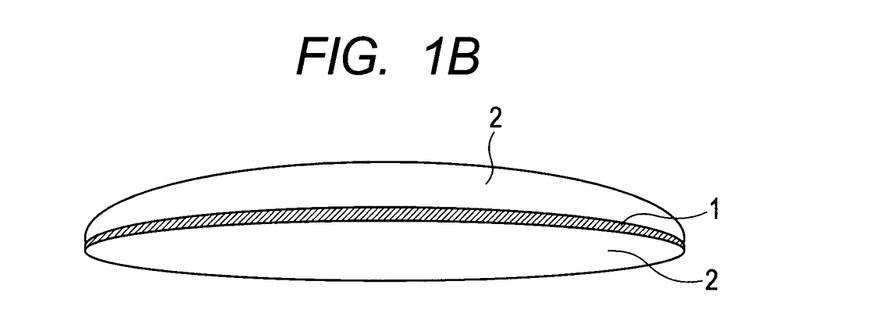

FIGS. 1A and 1B are explanatory diagrams of composite optical elements of the present invention. FIG. 1A illustrates a composite optical element in which a resin material 1 is bonded on a glass substrate 2. FIG. 1B illustrates a composite optical element in which a resin material 1 is bonded to two glass substrates 2 so as to be sandwiched therebetween.

<Glass Material>

Any glass material can be used for the lenses of examples without any particular limitation. Any transparent glass applicable to composite molding of a resin material and a glass material is perfectly acceptable. It is possible to use, for example, various glass materials such as general optical glass typified by silicate glass, borosilicate glass, and phosphate glass, quartz glass, and glass ceramics.

The shape of a glass substrate is not changed by composite molding in this example, and hence there is used a substrate precisely produced beforehand so as to match the shape of a molded composite element to be molded. A circular shape, a square shape, or any other arbitrary shape can be used as the shape of a glass substrate in terms of its outer shape. A surface can be selected from a flat surface, a spherical surface, an axisymmetric aspherical surface, and a free-form surface in terms of the optical functional surface of a glass substrate. There are given, for example, a cutting work, a grinding work, a polishing work, and press molding as a method of producing a glass substrate.

Pre-treatment is desirably applied to a glass substrate on a surface to which a resin material is closely bonded, in order to improve the adhesiveness with the resin material. The pre-treatment on a surface of the glass substrate is carried out by suitably using coupling treatment with any of various silane coupling agents having good affinity to the resin. Specific examples of the silane coupling agents include hexamethyldisilazane, methyltrimethoxysilane, trimethylchlorosilane, and triethylchlorosilane.

<Resin Material>

Any resin material can be used for the lenses of examples without any particular limitation. Any transparent thermoplastic resin applicable to composite molding of a resin material and a glass material is perfectly acceptable. It is possible to use, for example, a polyolefin-based resin, an acrylic resin, polycarbonate, and polyethylene terephthalate. Besides, other organic substances and inorganic substances may be mixed in these resins in order to adjust their optical physical properties and mechanical physical properties.

<Production Apparatus for Composite Optical Element>

Figure 2:
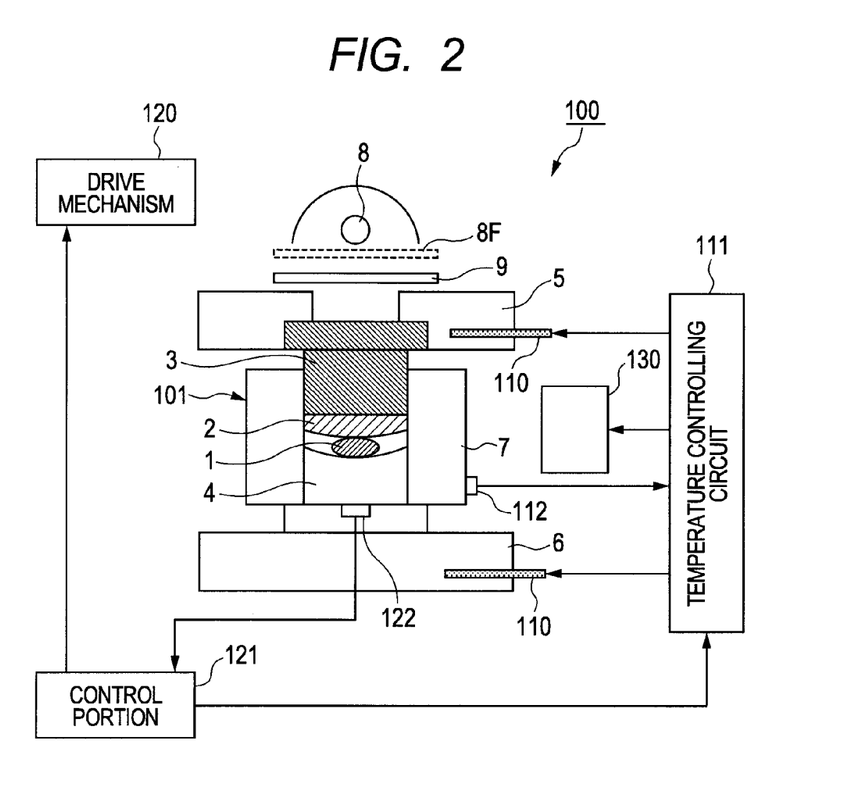
FIG. 2 is an explanatory diagram of a configuration of a production apparatus for a composite optical element.
Figure 3:
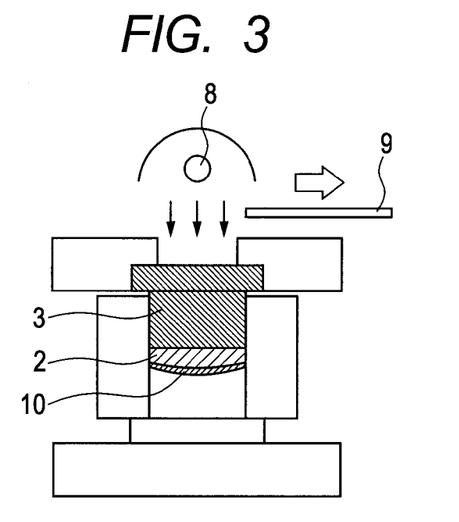
FIG. 3 is an explanatory diagram of a movement of the production apparatus for a composite optical element.

FIG. 2 is an explanatory diagram of a configuration of a production apparatus for a composite optical element. FIG. 3 is an explanatory diagram of a movement of the production apparatus for a composite optical element. Note that, in the descriptions of the drawings mentioned below, the same reference signs as those used in FIG. 2 refer to the same configuration elements.

As illustrated in FIG. 2, a production apparatus 100 for a composite optical element produces a composite lens element formed of a glass material and a resin material, by compression molding performed by feeding a resin material between a glass substrate 2 and a lower mold 4, followed by compression under heating. An upper mold 3, which is one example of a first supporting member, is formed of a material having a lower absorptivity with respect to infrared light having a wavelength region of 1 µm or more to 4 µm or less than the resin material, and closely contacts with the surface of a composite optical element on the glass material side. The lower mold 4, which is one example of a second supporting member, closely contacts with the composite optical element at the side opposite to the upper mold 3 and pressures the composite optical element together with the upper mold 3. An infrared lamp 8, which is one example of an infrared light source, irradiates the resin material in the composite optical element with infrared light having a wavelength region of 1 µm or more to 4 µm or less through the upper mold 3 and the glass substrate 2.

A compression mold 101 used in the production apparatus 100 for a composite optical element is provided with the upper mold 3 and the lower mold 4 in a slidable way in a cylinder-like body mold 7. The upper mold 3 supporting the glass substrate 2 is made of a material which transmits infrared rays. The material of the upper mold 3 is not particularly limited and any material that transmits infrared rays and is capable of resisting the pressure of compression molding is perfectly acceptable. It is possible to use, for example, glass, calcium fluoride, zinc selenide, silicon, and germanium.

An upper plate 5 for holding the upper mold 3 and a lower plate 6 for holding the lower mold 4 can be heated to any temperature by using a heating apparatus (heater) 110 under control by a temperature controlling circuit 111. The temperature controlling circuit 111 controls the temperature of a resin at the time of its molding based on the output of a temperature detection element (thermistor) 112 connected to the body mold 7.

A drive mechanism (pressure cam) 120 drives the upper plate 5 downward and presses the glass substrate 2 held by the upper mold 3 onto the resin material 1 softened on the lower mold 4, thereby drawing the resin material 1 under pressure. A control portion 121 controls with high precision the pressure applied to the resin at the time of drawing the resin material 1 under pressure, based on the output of a load detection sensor 122 provided at the lower plate 6.

A cooling apparatus (cooling fan) 130 cools the body mold 7 after molding of the resin material 1, thereby solidifying it. The control portion 121 activates the cooling apparatus (cooling fan) 130 by controlling the temperature controlling circuit 111.

A shutter 9 and the infrared lamp 8 are provided in order to perform reheating by controlling the cooling process after the molding. The movement of each of the shutter 9 and the infrared lamp 8 is controlled by the control portion 121. The control portion 121 can precisely control the heating condition of the resin material 1 heated by infrared rays via the upper mold 3 by controlling the opening and closing of the shutter 9 while emitting infrared rays from the infrared lamp 8.

The infrared lamp is not particularly limited, and any lamp is acceptable as long as the lamp emits infrared rays. For example, there may be used a halogen lamp, a metal halide lamp, a xenon lamp, a carbon heater, a ceramic heater, or an infrared laser such as a carbon dioxide laser or a YAG laser.

Any wavelength of infrared rays, which transmits the glass substrate 2 and is absorbed by the resin material 1, is perfectly acceptable. To be specific, the wavelength is 1 μm to 4 μm, and is desirably 1.5 μm to 3 μm, more desirably 2 μm to 2.8 μm.

The control of the temperature of the resin heated by infrared irradiation may be done by performing feedback to the output of the infrared lamp 8 by using a non-contact type radiation thermometer. However, in this case, the relationship among the emission intensity and the irradiation time of the infrared lamp 8 and the temperature of the resin is preliminarily measured, and the temperature of the resin is indirectly controlled by adjusting the emission intensity and the irradiation time of the infrared lamp 8.

Note that, a general infrared lamp other than a laser emits infrared rays having a broadband wavelength, and hence it is desirable to use a bandpass filter 8F (or cold mirror) for cutting visible rays and infrared rays having unnecessary wavelengths.

Figure 7A:
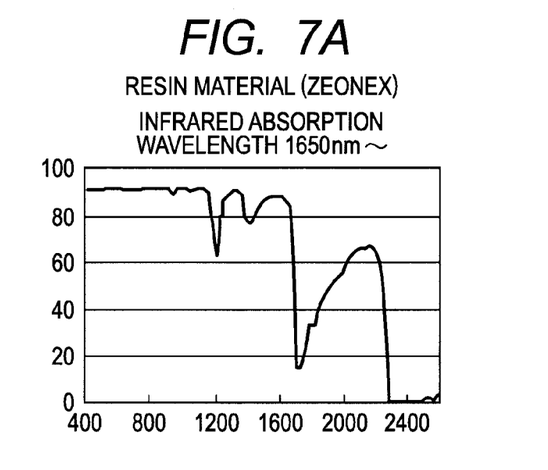
FIGS. 7A and 7B are line graphs of infrared transmittances of a resin material and a glass material, respectively.
Figure 7B:
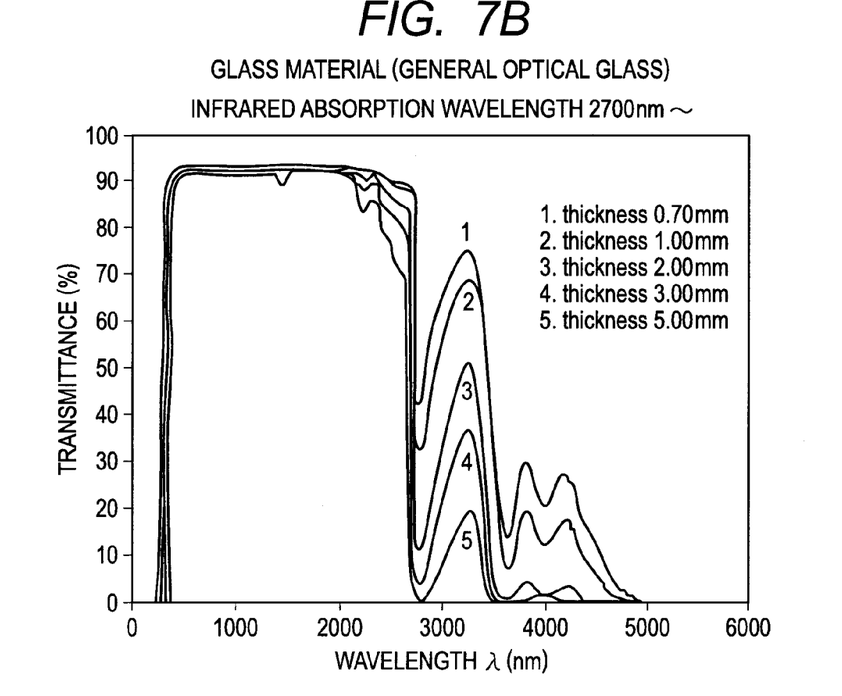

In the production apparatus 100 for a composite optical element, infrared light entering the glass substrate 2 has a wavelength peak in the range of 1 μm or more to 4 μm or less. When the wavelength region of the infrared light is 1 μm to 4 μm, as illustrated in FIGS. 7A and 7B, the infrared light selectively heats only the resin in the vicinity of the interface between the glass substrate 2 and the resin material 1, thus being able to provide sufficiently the effect of a stress removal step (see FIGS. 7A and 7B). Irradiated infrared rays are rarely absorbed by the glass substrate but are absorbed by the transparent resin.

When the wavelength of the infrared rays is shorter than 1 μm, most of the infrared rays transmit a transparent resin without being absorbed by the transparent resin, and hence the infrared rays cannot heat the resin. Further, even if a resin absorbs infrared rays in some degree, the infrared rays heat the whole resin, and hence it is difficult to heat selectively only the resin layer located in the vicinity of the interface and contacting the glass substrate 2. On the other hand, when the wavelength of the infrared rays is longer than 4 μm, most of the infrared rays are absorbed by a glass material, and hence it is difficult to heat only the resin layer located in the vicinity of the interface and contacting the glass substrate 2.

<Molding Step>

Next, a method of controlling the production apparatus 100 for a composite optical element is described. First, an operator places the resin material 1 and the glass substrate 2 in the compression mold 101 and inputs a command to the control portion 121 so as to start the molding of a composite lens element. The control portion 121 controls the temperature controlling circuit 111, the heating apparatus 110, the cooling apparatus 130, and the drive mechanism 120 according to a preliminarily set program, thus producing a composite lens element.

The control portion 121 controls the temperature controlling circuit 111 to heat the upper plate 5 and the lower plate 6 with the heating apparatus 110, thereby heating the resin material 1 up to a molding temperature, which is equal to or higher than the glass transition temperature of the resin material. The molding temperature is a temperature at which a resin material is moldable, and any temperature at which the resin material is not degraded is perfectly acceptable. The range of the molding temperature is 60° C. to 400° C., and is desirably 80° C. to 300° C., more desirably 100° C. to 250° C.

The control portion 121 then controls the drive mechanism 120 to transfer the upper plate 5 downward so as to press the glass substrate 2 held by the upper mold 3 onto the softened resin material 1, thereby drawing the resin material 1 under pressure to obtain a resin layer 10 as illustrated in FIG. 3. In this case, the molding pressure applied to the resin material 1 is 1 MPa to 500 MPa, and is desirably 3 MPa to 200 MPa, more desirably 5 MPa to 100 MPa. When pressure is to be applied, the molding pressure may be applied from the beginning, but it is desired to increase the pressure from a low pressure up to the molding pressure in stages.

The control portion 121 then controls the cooling apparatus 130 to cool the upper plate 5 and the lower plate 6 while applying the molding pressure, thereby cooling the whole resin to a temperature equal to or lower than the glass transition temperature, resulting in the solidification of the whole resin.

<Stress Removal Step>

Figure 4:
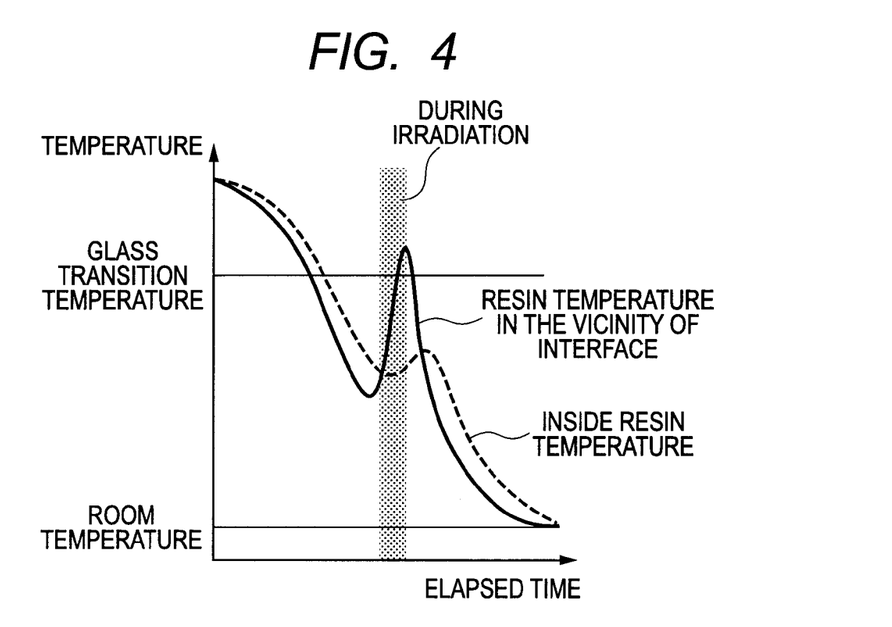
FIG. 4 is an explanatory diagram of temperature control of a resin layer in a cooling process of a composite optical element.

FIG. 4 is an explanatory diagram of temperature control of the resin layer in the cooling process of the composite optical element. As illustrated in FIG. 3, when a molten resin filled so as to contact the glass substrate 2 is cooled and solidified, after the temperature of the molten resin becomes lower than the glass transition temperature of the resin material, the fluidity of the resin layer 10 is lost, resulting in the solidification of its shape. After that, when the molded body in which the glass substrate 2 and the resin layer 10 are integrated is cooled to room temperature, the resin layer 10 is more likely to shrink than the glass substrate 2, because the shrinkage amount of the resin layer 10 is larger than the shrinkage amount of the glass substrate 2.

However, because the glass substrate 2 and the resin layer 10 are closely bonded, the resin layer 10 having a smaller Young's modulus compared with the glass material for the glass substrate 2 is inhibited from shrinking, thereby generating strain inside. As a result, variation in refractive index in the resin layer occurs because of difference in density in the resin layer, and the warpage and deformation of the resin layer occur owing to its internal stress, resulting in the degradation of the performance of the resultant optical element.

Thus, the production apparatus 100 for a composite optical element includes the stress removal step for releasing strain in the resin layer after the molding step for filling a resin melt by heating between the glass substrate 2 and the lower mold 4. In the stress removal step, when the resin is cooled and solidified, infrared rays having a certain wavelength region which transmit the glass substrate 2 and are absorbed by the resin material are applied from the glass substrate side to heat only the resin in the vicinity of the interface between the glass substrate 2 and the resin layer 10 at a temperature equal to or higher than the glass transition temperature. That is, after the whole molten resin is cooled to a temperature equal to or lower than the glass transition temperature, infrared rays are emitted from the glass substrate side to heat only the resin in the vicinity of the interface between the glass substrate 2 and the resin layer 10 at a temperature equal to or higher than the glass transition temperature of the resin, thereby releasing strain in the resin layer.

As illustrated in FIG. 3, the control portion 121 drives and opens the shutter 9, to thereby apply infrared rays emitted from the infrared lamp 8 onto the resin layer 10 through the upper mold 3 and the glass substrate 2. Then, when the temperature of the resin in the vicinity of the interface between the glass substrate 2 and the resin layer 10 reaches a temperature equal to or higher than its glass transition temperature, the control portion 121 drives and closes the shutter 9 to stop the emission of infrared rays.

FIG. 4 illustrates the changes in the resin temperature in the vicinity of the interface and the inside resin temperature at this time. The control portion 121 controls the cooling process of a composite optical element so that the resin temperature in the vicinity of the interface represented by a solid line in FIG. 4 exceeds the glass transition temperature, but the inside resin temperature does not exceed the glass transition temperature.

The thickness of the interface layer heated to a temperature equal to or higher than the glass transition temperature by infrared rays emitted from the infrared lamp 8 is 10 μm to 450 μm, and is desirably 20 μm to 200 μm, more desirably 30 μm to 100 μm.

Finally, the control portion 121 causes the upper plate 5 to transfer upward to release the pressure applied to the resin, and controls the cooling apparatus 130 to reduce the temperature of the body mold 7 to room temperature, and consequently, the resultant composite lens element is ready to be taken out. After the body mold 7 is cooled to room temperature, the operator takes out a molded body of the composite lens element from the compression mold 101, thus obtaining a composite optical element.

<Effect of Stress Removal Step>

Elements formed of resin are widely used as optical elements such as an optical lens, a prism, and an optical waveguide from the viewpoints of good moldability and mass production efficiency. Further, it is easy to adjust optical characteristics of resin materials, such as a refractive index and scattering, by adding other components such as inorganic fine particles to the resin materials, and hence the resin elements are used for an achromatic lens, etc., which need to have special optical characteristics. However, 100% resin optical elements are vulnerable to a change in temperature, resulting in a significant change in dimension and a significant change in refractive index. Therefore, the 100% resin optical elements sometimes cannot satisfy performance required for optical elements used in a broad temperature range, such as a camera lens.

In order to solve such a problem, it has been proposed to produce a composite optical element having both the good moldability and optical characteristics of a resin material and the dimension stability of a glass material, by combining a transparent glass material and a transparent thermoplastic resin material. Further, there has been proposed a method of molding a composite optical element in which a transparent glass substrate and a transparent thermoplastic resin-molded layer are integrated.

However, when a resin material and a glass material are molded under heating into an integrated body, followed by cooling to room temperature, difference in degree of shrinkage between the glass material and the thermoplastic material may cause a residual strain in the resultant resin layer, possibly leading to reduction in the performance of the finally resulting optical element. However, PTL 3 described above does not disclose a technology for improving strain in a resin layer caused by difference in shrinkage amount between glass and resin.

By combining a glass substrate and a transparent resin, it is possible to produce an optical element having both the good moldability and optical characteristics of resin and the dimension stability of glass. In this case, in order for the optical element to have dimension stability similar to that of glass, the glass substrate and the resin need to be firmly bonded to each other. Then, in the cooling step of the composite molding, difference in degree of shrinkage between glass and resin blocks the resin from shrinking, resulting in the production of strain in the resin. Internal strain caused by difference in shrinkage amount between the glass substrate and the resin at the time of cooling and solidification mainly occurs particularly in the resin in the vicinity of the interface between the glass substrate and the resin.

In contrast, by using the production apparatus 100 for a composite optical element, it is possible to obtain a composite optical element having both the good moldability and optical characteristics of resin and the dimension stability of glass and having small strain in a resin layer. This is because there is performed a molding step in which a composite optical element is molded by integrating under heating a resin material with one surface of a glass material, followed by execution of a stress removal step, thereby removing the internal strain of the resin material.

In the stress removal step, the composite optical element produced in the molding step is cooled to a first cooling temperature lower than the glass transition temperature of the resin material, and then infrared light having a wavelength region in which the infrared absorptivity of the resin material is higher than that of the glass material is caused to enter from another surface of the glass material. The interface layer of the resin material, the interface layer contacting the glass material, is heated by the infrared light to a temperature equal to or higher than the glass transition temperature of the resin material, followed by cooling the interface layer to a second cooling temperature lower than the first cooling temperature.

The irradiated infrared rays having a certain wavelength region are rarely absorbed by the glass material and are absorbed by the resin material, and hence only the resin layer in the vicinity of the interface between the glass substrate and the resin layer material can be selectively heated. After that, the glass substrate and the molded resin layer are cooled to room temperature, resulting in reduction in strain in the resin layer.

By particularly heating only the resin located in the vicinity of the interface and having large internal strain to a temperature equal to or higher than its glass transition temperature, the internal strain in the vicinity of the interface can be reduced while the temperature of an inside resin having small internal strain is kept low. Then, when cooling and solidification are performed again, difference in shrinkage amount causes new internal strain similarly, but because the shrinkage amount of the inside resin is small, the difference with that of the glass substrate is smaller compared with that in the state before reheating, and thus a composite optical element having small internal strain can be obtained.

<Second and Third Stress Removal Steps>

Figure 5:
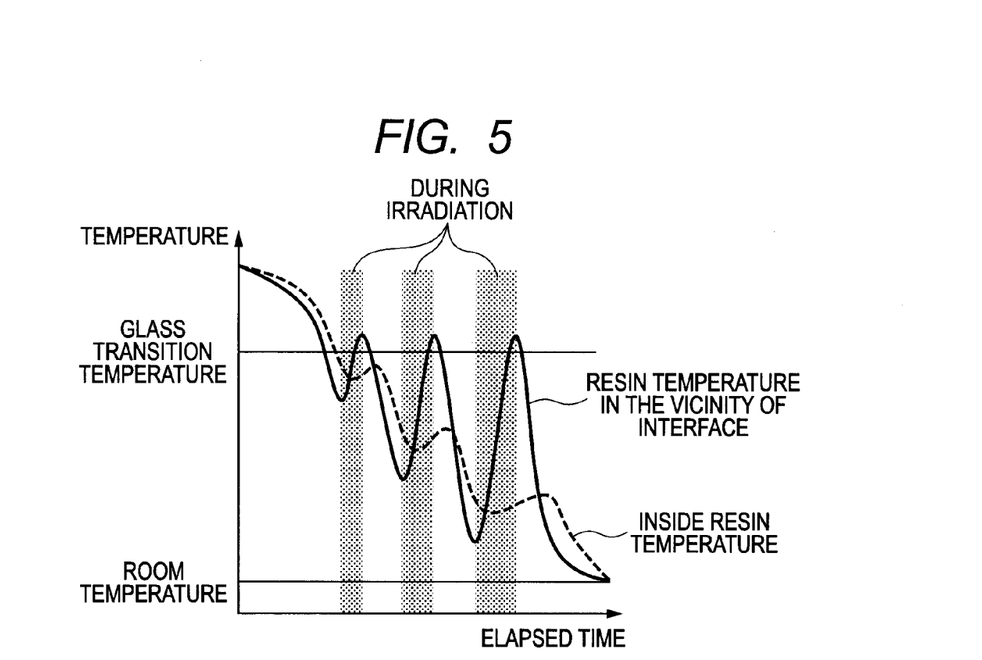
FIG. 5 is an explanatory diagram of temperature control of the resin layer in another cooling process of the composite optical element.

FIG. 5 is an explanatory diagram of temperature control of a resin layer in another cooling process of a composite optical element. As illustrated in FIG. 4, even if heating a resin by infrared-ray irradiation is performed once in a cooling process after molding of a composite lens element, the heating is effective for reducing internal strain. However, as illustrated in FIG. 5, it is more desirable to adopt a temperature profile in which stress removal steps are repeated multiple times to lower cooling temperature gradually. Stress removal steps are repeated multiple times, thereby being able to yield a composite optical element in which a resin material has small internal strain.

Here, after the composite optical element is cooled to the second cooling temperature in the first stress removal step, the composite optical element is again irradiated with infrared light, thereby heating the interface layer to a temperature equal to or higher than the glass transition temperature of the resin material, and is then cooled to a third cooling temperature lower than the second cooling temperature. Then, after the composite optical element is cooled to the third cooling temperature in the second stress removal step, the composite optical element is again irradiated with infrared light, thereby heating the interface layer to a temperature equal to or higher than the glass transition temperature of the resin material, and is then cooled to a fourth cooling temperature lower than the third cooling temperature.

That is, at the time of cooling and solidification, the shape of the resin is fixed at a temperature lower than the glass transition temperature of the resin, and as the resin temperature lowers, the internal strain of the resin becomes larger. Here, if the resin temperature is lowered sufficiently, the internal strain increases and the internal strain in the vicinity of the interface between the glass substrate and the resin extends into the inside of the resin. Then, even if the internal strain of the resin layer in the vicinity of the interface is reduced by subsequent infrared-ray heating, the internal strain inside the resin eventually remains.

Further, if the internal strain is reduced by infrared-ray heating soon after the temperature of the resin falls below its glass transition temperature, shrinkage at the time of subsequent cooling and solidification causes large strain, because the temperature of the inside of the resin is still as high as close to its glass transition temperature. Thus, at the time of the cooling and solidification, when the internal strain is accumulated a bit, the internal strain is once reduced by infrared-ray heating. By repeating this multiple times, the internal strain can be reduced at the time of decreasing the temperature of the inside of the resin, while the internal strain in the vicinity of the interface between the glass substrate and the resin is prevented from extending inside the resin. Thus, when the resin is finally cooled to room temperature, its internal strain can be further reduced.

<Another Production Apparatus for Composite Optical Element>

Figure 6:
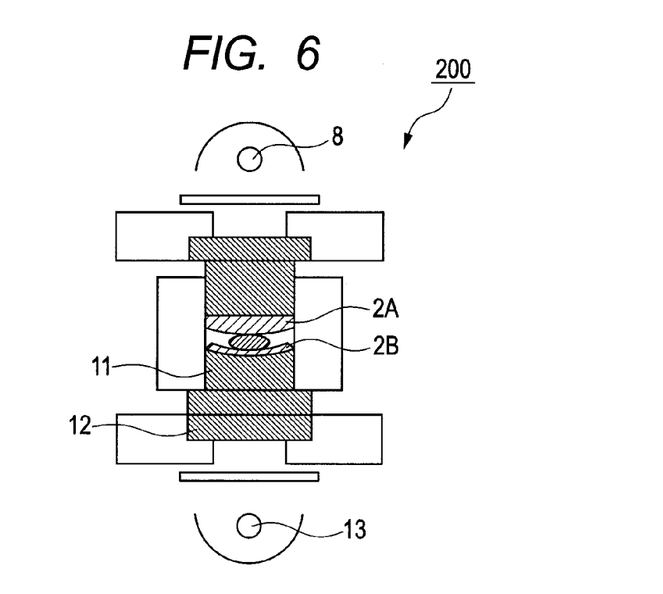
FIG. 6 is an explanatory diagram of a configuration of another production apparatus for a composite optical element.

FIG. 6 is an explanatory diagram of a configuration of another production apparatus for a composite optical element.

As illustrated in FIG. 6, a method of producing a composite optical element by molding a glass substrate and a thermoplastic resin into an integrated shape is not limited to compression molding performed by feeding a resin material between a glass substrate and a mold, followed by compression under heating as described in Example 1. A production apparatus 200 for a composite optical element in Example 2 produces a composite lens formed of a glass material and a resin material, by compression molding performed by feeding a resin material between a glass substrate 2A and a glass substrate 2B, followed by compression under heating.

As illustrated in FIG. 6, there is used a molding apparatus in which a material transmitting infrared rays is used for a lower mold 11 and a lower plate 12 and an infrared lamp 13 is provided below the lower plate 12, and a resin material is fed into the space between the glass substrate 2A and the glass substrate 2B. After that, both the upper and lower surfaces of the resultant resin layer are molded by performing the same molding step as that described by referring to FIGS. 1A and 1B, and the strain of the resin layer is removed by performing the same stress removal step as that described by referring to FIG. 2. As a result, there can be obtained a composite optical element in which a resin is integrated with two glass substrates between the two glass substrates.

Note that, it is also possible to use suitably, as a method of producing a composite optical element by molding a glass substrate and a thermoplastic resin into an integrated shape, an insert molding method of integrating a glass substrate and a resin by injecting a molten resin into an injection mold in which the glass substrate is placed.

EXAMPLE 1

FIGS. 7A and 7B are line graphs of infrared transmittances of a resin material and a glass material. In Example 1, the production apparatus 100 for a composite optical element illustrated in FIG. 2 was used to perform a molding step and then control such a cooling process as illustrated in FIG. 4, thereby molding a disk-shaped composite molded body. Then, after being cooled to room temperature, the composite optical element was measured for its refractive-index distribution, to thereby evaluate its optical performance.

In Example 1, there was used, as a transparent thermoplastic resin material, ZEONEX E48R (product name) (glass transition temperature: 139° C.), which is a polyolefin-based resin, manufactured by Zeon Corporation. As illustrated in FIGS. 1A and 1B, there was used, as a glass substrate 2, S-BSL7 (product name) manufactured by OHARA Inc, which is processed so as to have a disk shape having both flat surfaces with a diameter of 20 mm and a thickness of 3 mm. Used as an infrared lamp 8 was QCH-HEATER (product name) (output 120 W) manufactured by Covalent Materials Corporation. As illustrated in FIGS. 7A and 7B, in consideration of the infrared transmittances of a resin material and a glass material, a bandpass filter 8F was used and infrared rays having a wavelength of 2.4 µm to 2.6 µm were used.

First, 0.63 g of a resin material 1 and a glass substrate 2 were placed in a compression mold 101, and the resin material 1 was heated to 180° C. After that, a 310-kg load was applied to an upper mold 3 and the resin material 1 was drawn under pressure to form a resin layer (10: FIG. 3) on the surface of the glass substrate 2. Next, the resin was cooled to 90° C. while the load was being kept, and a shutter 9 was opened to emit infrared rays. After infrared rays were emitted for 3 seconds, the shutter 9 was closed. In this case, the thickness of a resin heated to a temperature equal to or higher than its glass transition temperature was 60 µm. After that, the resultant composite optical element was cooled to room temperature, yielding a molded body.

EXAMPLE 2

The same molding step as that in Example 1 was performed to mold a composite optical element, and in a stress removal step, infrared irradiation was carried out for 4 seconds, which was longer than the irradiation time in Example 1. A computer simulation showed that in this case, the thickness of a resin heated to a temperature equal to or higher than its glass transition temperature was 450 µm. A composite optical element having the same outer appearance as that in Example 1 was molded, yielding a molded body.

EXAMPLE 3

The same molding step as that in Example 1 was performed to mold a composite optical element, and in a stress removal step, a cooling process was controlled as illustrated in FIG. 5. A resin was drawn under pressure to form a resin layer 10. When the resin layer 10 was cooled to 110° C., the resin layer 10 was irradiated with infrared rays for 2.4 seconds. Next, when the resin layer 10 was cooled to 90° C., the resin layer 10 was irradiated with infrared rays for 3 seconds. Next, when the resin layer 10 was cooled to 60° C., the resin layer 10 was irradiated with infrared rays for 4 seconds. A computer simulation showed that in this case, the thickness of a resin heated to a temperature equal to or higher than its glass transition temperature by each infrared irradiation was 60 µm. Thus, a composite optical element having the same outer appearance as that in Example 1 was molded, yielding a molded body.

COMPARATIVE EXAMPLE 1

The same molding step as that in Example 1 was performed to mold a composite optical element, and infrared irradiation was not carried out in a stress removal step, except which the same method as that in Example 1 was performed to mold a composite optical element having the same outer appearance as that in Example 1, yielding a molded body.

COMPARATIVE EXAMPLE 2

The same molding step as that in Example 1 was performed to mold a composite optical element, and in a stress removal step, infrared irradiation was carried out for 5 seconds, which was longer than the irradiation time in Example 2. A computer simulation showed that in this case, the thickness of an interface resin heated to a temperature equal to or higher than the glass transition temperature was 900 µm. Except for this point, the same method as that in Example 1 was performed to mold a composite optical element having the same outer appearance as that in Example 1, yielding a molded body.

<Measurement and Evaluation of Molded Body>

Methods of measuring and evaluating each molded body thus produced are described. The refractive-index distribution of the molded body of the composite optical element thus produced is calculated by measuring the distribution of the optical path lengths of the molded body by using an interferometer. First, the molded body is immersed in a matching oil prepared so as to have a refractive index matching to the average refractive index of the molded body. Next, the interferometer (GPI (product name) manufactured by Zygo Corporation) is used to measure the distribution of the optical path lengths of the molded body, with the arrangement order of an object to be measured and a reflective mirror with respect to the interferometer. Next, the measured distribution of the optical path lengths is multiplied by the measurement wavelength (632.8 nm) of the interferometer, followed by division by the thickness of the molded body, thereby calculating the refractive-index distribution of the molded body.

Table 1 shows the results obtained.

TABLE 1

| | Frequency of heating by infrared irradiation | Thickness of resin heated to temperature equal to or higher than glass transition temperature | Refractive-index distribution ($\times 10^{-4}$) | Judgment |
|---|---|---|---|---|
| Example 1 | Once | 60 µm | 1.4 | B |
| Example 2 | Once | 450 µm | 1.8 | B |
| Example 3 | Three times | 60 µm | 0.8 | A |
| Comparative Example 1 | Not carried out. | — | 2.5 | C |
| Comparative Example 2 | Once | 900 µm | 2.4 | C |

In Table 1, the evaluation of the refractive-index distribution of each molded body was represented based on the following criteria. A molded body having a refractive-index distribution of $1 \times 10^{-4}$ or less was represented by A, one having a refractive-index distribution of $1 \times 10^{-4}$ to $2 \times 10^{-4}$ was represented by B, and one having a refractive-index distribution of more than $2 \times 10^{-4}$ was represented by C.

It can be found clearly from results in Table 1 that the molded bodies molded by any of the methods of Examples 1 to 3 by using the production apparatus 100 for a composite optical element have a smaller refractive-index distribution, and each molded body has smaller internal strain in its resin material.

Thus, the thickness of a resin layer heated to a temperature equal to or higher than the glass transition temperature in the stress removal step is preferably in the range of 10 µm or more to 450 µm or less. This is because, when the thickness of the resin heated to a temperature equal to or higher than its glass transition temperature is in the range of 10 µm or more to 450 µm or less, it is possible to obtain a composite optical element having smaller strain in its resin.

In contrast, when the thickness of a resin heated to a temperature equal to or higher than its glass transition temperature is less than 10 µm, the whole interface of the resin not necessarily has the glass transition temperature evenly, and hence strain in the whole resin layer is not sufficiently reduced, and the effect of the stress removal step is not sufficiently provided. The lower limit, 10 μm, was determined based on the results of a computer simulation of a temperature distribution in the interface of the resin.

On the other hand, when the thickness of a resin layer heated to a temperature equal to or higher than the glass transition temperature is thicker than 450 μm, heating once reduces strain in the resin, but at the time of subsequent cooling and solidification, large internal strain occurs again. Thus, the effect of releasing a residual stress is not sufficiently provided.

EXAMPLE 4

A method of producing a composite optical element is not limited to a method in which a molding step of a composite optical element is carried out and subsequently, a stress removal step is immediately carried out. That is, a composite optical element obtained by going through a molding step, followed by cooling to room temperature in an ordinary manner can be independently subjected to only a stress removal step by heating the composite optical element up to a temperature slightly lower than the glass transition temperature of a resin material. It is possible to remove the stresses of a glass material and resin material from a composite optical element heated at a temperature lower than the glass transition temperature of a resin material by controlling a cooling process as illustrated in FIG. 4 or FIG. 5.

In the stress removal step, as described above, infrared light having a wavelength region in which the infrared absorptivity of the resin material is higher than that of the glass material is caused to enter from the surface of the composite optical element on the glass material side. As a result, the interface layer of the resin material, the interface layer contacting the glass material, can be selectively heated to a temperature equal to or higher than the glass transition temperature of the resin material. Then, subsequent cooling removes the stresses of the resin material outside the interface layer and the glass material, both the materials being kept under a temperature lower than the glass transition temperature of the resin material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-250905, filed Nov. 9, 2010, which is hereby incorporated by reference herein in its entirety.

The invention claimed is:

1. A method of producing a composite optical element in which a transparent thermoplastic resin material is integrated with one surface of a transparent glass substrate by heating, the method comprising:

a molding step of molding a composite optical element by integrating the transparent thermoplastic resin material with the one surface of the transparent glass substrate in a heated state;

a cooling step of cooling the composite optical element prepared in the molding step to a first cooling temperature lower than a glass transition temperature of the transparent thermoplastic resin material;

after the cooling step, a heating step of heating an interface layer of the transparent thermoplastic resin material, the interface layer contacting the transparent glass substrate, to a temperature equal to or higher than the glass transition temperature of the transparent thermoplastic resin material, by causing infrared light having a wavelength region in which an infrared absorptivity of the transparent thermoplastic resin material is higher than an infrared absorptivity of the transparent glass substrate to enter from a surface on the transparent glass substrate to the transparent thermoplastic resin material; and a stress removal step of cooling the composite optical element to a second cooling temperature lower than the first cooling temperature, wherein in the heating step, only a portion of the interface layer that is in contact with the transparent glass substrate is heated, and wherein the portion of the interface layer has a thickness of 10 μm to 450 μm.

2. The method according to claim 1, further comprising, after the composite optical element is cooled to the second cooling temperature:

causing the infrared light having the wavelength region to enter again from the surface on the transparent glass substrate to the transparent thermoplastic resin material, thereby heating the interface layer to a temperature equal to or higher than the glass transition temperature of the transparent thermoplastic resin material; and then cooling the composite optical element again to a third cooling temperature lower than the second cooling temperature.

3. The method according to claim 2, further comprising, after the composite optical element is cooled to the third cooling temperature:

causing the infrared light having the wavelength region to enter again from the surface on the transparent glass substrate to the transparent thermoplastic resin material, thereby heating the interface layer to a temperature equal to or higher than the glass transition temperature of the transparent thermoplastic resin material; and then cooling the composite optical element to a fourth cooling temperature lower than the third cooling temperature.

4. The method according to claim 1, wherein the infrared light has a wavelength of 1 μm to 4 μm.

5. The method according to claim 1, wherein the composite optical element is an optical lens.

6. A method of producing a composite optical element in which a transparent thermoplastic resin material is integrated by heating between two transparent glass substrates opposed to each other, the method comprising:

a molding step of molding a composite optical element by integrating the transparent thermoplastic resin material between the two transparent glass substrates in a heated state; and a stress removal step, wherein:

the composite optical element prepared in the molding step is cooled to a first cooling temperature lower than a glass transition temperature of the transparent thermoplastic resin material;

thereafter, an infrared light having a wavelength region in which an infrared absorptivity of the transparent thermoplastic resin material is higher than an infrared absorptivity of the two transparent glass substrates is entered from both outer surfaces of the two transparent glass substrates, whereby an interface layer of the transparent thermoplastic resin material, which is in contact with one of the two transparent glass substrates, is heated to a temperature equal to or higher than the glass transition temperature of the transparent thermoplastic resin material; and thereafter the composite optical element is cooled to a second cooling temperature lower than the first cooling temperature, wherein only a portion of the interface layer that is in contact with the one of the two transparent glass substrates is heated, and wherein the portion of the interface layer has a thickness of 10 μm to 450 μm.

7. The method according to claim 6, further comprising a second stress removal step, wherein:

after the composite optical element is cooled to the second cooling temperature in the stress removal step, the infrared light having the wavelength region is again entered from the both outer surfaces of the two transparent glass substrates, whereby the interface layer is heated to a temperature equal to or higher than the glass transition temperature of the transparent thermoplastic resin material; and thereafter, the composite optical element is cooled to a third cooling temperature lower than the second cooling temperature.

8. The method according to claim 7, further comprising a third stress removal step, wherein:

after the composite optical element is cooled to the third cooling temperature in the second stress removal step, the infrared light having the wavelength region is again entered from the both outer surfaces of the two transparent glass substrates, whereby the interface layer is heated to a temperature equal to or higher than the glass transition temperature of the transparent thermoplastic resin material; and thereafter the composite optical element is cooled to a fourth cooling temperature lower than the third cooling temperature.

9. The method according to claim 6, wherein the infrared light has a wavelength of 1 μm to 4 μm.

10. The method according to claim 6, wherein the composite optical element is an optical lens.

11. A method of removing stress of a composite optical element in which a transparent thermoplastic resin material is integrated with one surface of a transparent glass substrate by heating, the method comprising:

entering, to the composite optical element at a temperature lower than a glass transition temperature of the transparent thermoplastic resin material, an infrared light having a wavelength region in which an infrared absorptivity of the transparent thermoplastic resin material is higher than an infrared absorptivity of the transparent glass substrate from a surface on a transparent glass substrate side of the composite optical element to the transparent thermoplastic resin material;

selectively heating an interface layer of the transparent thermoplastic resin material, which is in contact with the transparent glass substrate, to a temperature higher than the glass transition temperature of the transparent thermoplastic resin material; and thereafter, cooling the composite optical element to remove a stress of the transparent thermoplastic resin material at an outside of the interface layer, which is kept at a temperature lower than the glass transition temperature of the transparent thermoplastic resin material and a stress of the transparent glass substrate, wherein only a portion of the interface layer that is in contact with the transparent glass substrate is heated, and wherein the portion of the interface layer has a thickness of 10 μm to 450 μm.

* * * * *